(12) United States Patent
Tofflemire et al.

(10) Patent No.: US 11,649,041 B2
(45) Date of Patent: May 16, 2023

(54) METHODS FOR STABLE EXTENSION OF LANDING GEAR SYSTEMS

(71) Applicants: SAFRAN LANDING SYSTEMS, Velizy-Villacoublay (FR); SAFRAN LANDING SYSTEMS CANADA INC., Ajax (CA)

(72) Inventors: Cole Tofflemire, Essex (CA); Graeme Peter Arthur Klim, Vélizy-Villacoublay (FR); Thibaud Mazoue, Nogent sur marne (FR); Andrew Michael Ellis, Guelph (CA)

(73) Assignees: SAFRAN LANDING SYSTEMS, Velizy-Villacoublay (FR); SAFRAN LANDING SYSTEMS CANADA INC., Ajax (CA)

( * ) Notice: Subject to any disclaimer, the term of this patent is extended or adjusted under 35 U.S.C. 154(b) by 360 days.

(21) Appl. No.: 16/934,856

(22) Filed: Jul. 21, 2020

(65) Prior Publication Data
US 2022/0024566 A1 Jan. 27, 2022

(51) Int. Cl.
*B64C 25/28* (2006.01)
(52) U.S. Cl.
CPC .................................... *B64C 25/28* (2013.01)
(58) Field of Classification Search
CPC ... B64C 25/28; B64C 2025/008; B64C 25/02; B64C 25/04
See application file for complete search history.

(56) References Cited

U.S. PATENT DOCUMENTS

| 2,601,962 | A | | 7/1952 | Douglas | |
| 2,909,342 | A | | 10/1959 | Maltby | |
| 2,927,747 | A | * | 3/1960 | Bennie | B64C 25/52 244/17.17 |
| 3,191,316 | A | * | 6/1965 | Dryden | B64G 1/62 434/34 |
| 3,411,349 | A | | 11/1968 | Smith et al. | |
| 4,062,507 | A | * | 12/1977 | Felder | B64C 25/00 244/104 FP |
| 5,850,057 | A | | 12/1998 | Veillette | |
| 7,369,922 | B2 | | 5/2008 | Garcia | |
| 9,592,908 | B2 | * | 3/2017 | Gentry | B64C 25/10 |
| 2003/0011493 | A1 | * | 1/2003 | Wiplinger | B64C 25/28 340/960 |
| 2007/0221783 | A1 | * | 9/2007 | Parks | G06Q 30/08 244/102 A |

(Continued)

FOREIGN PATENT DOCUMENTS

FR 2887516 A1 12/2006

*Primary Examiner* — Justin M Benedik
(74) *Attorney, Agent, or Firm* — Christensen O'Connor Johnson Kindness PLLC

(57) ABSTRACT

A method for extending a landing gear system for a vehicle is disclosed. The landing gear system includes a first landing gear assembly and a second landing gear assembly. The method includes the steps of sensing a first load on the first landing gear assembly after the first landing gear assembly has reached a wheels-on-ground state and comparing the first load to a first target value. The method further includes the step of controlling an extension speed of the first landing gear assembly according to a difference between the first load and the first target value.

20 Claims, 7 Drawing Sheets

(56) References Cited

U.S. PATENT DOCUMENTS

| | | | |
|---|---|---|---|
| 2012/0217339 A1* | 8/2012 | Gilleran | B64C 25/405 244/50 |
| 2012/0298796 A1* | 11/2012 | Carreker | B64G 1/22 244/100 R |
| 2017/0274988 A1* | 9/2017 | Nguyen | B64C 25/52 |
| 2018/0312245 A1 | 11/2018 | Klim et al. | |
| 2020/0207463 A1* | 7/2020 | Schuster | B64C 25/26 |
| 2020/0277044 A1* | 9/2020 | Kerr | B64C 25/30 |
| 2022/0033103 A1* | 2/2022 | O'Neill | A47B 91/16 |

* cited by examiner

METHODS FOR STABLE EXTENSION OF LANDING GEAR SYSTEMS

BACKGROUND

Vehicles with takeoff and landing functionality, such as aircraft, maglev vehicles, helicopters, urban air mobility vertical take-off and landing (VTOL) vehicles, etc., often have landing gear systems that reciprocate between an extended position and a retracted position. When the vehicle is not airborne or levitated, or is not otherwise supported by a ground surface, the landing gear system is extended and in contact with the ground (or other support surface) to support the vehicle. When the vehicle is airborne or otherwise levitated, the landing gear system retracts to reduce drag and prevent damage to the landing gear system that may occur at high speed travel.

Some landing gear systems include a plurality of individual landing gear assemblies that use a motor drive system to rotate a drive screw to extend and retract the landing gear assembly. During landing events, the landing gear assemblies of a vehicle may not touch down in unison. Further, the landing gear assemblies can be subjected to different loads throughout the landing process. Moreover, a failure of one or more landing gear assemblies can result in undesirable loads on the still-functioning landing gear assemblies and/or can provide asymmetric or unstable vehicle support.

SUMMARY

The subject matter disclosed herein provides methods of deploying a landing gear system with improved stability. In some embodiments, the deployment speeds of individual landing gear assemblies are controlled to minimize the time between a first landing gear assembly reaching a Wheels-on-Ground state and all of the landing gear assemblies having reached a Wheels-on-Ground state. After Wheels-on-Ground has been reached for all of the landing gear assemblies, the landing gear assemblies are further extended until all of the landing gear assemblies reach a Weight-on-Wheels state. The deployment speeds of individual landing gear assemblies are further controlled to minimize the time between a first landing gear assembly reaching a Weight-on-Wheels state and all of the landing gear assemblies having reached a Weight-on-Wheels state. In some embodiments, the deployment of the landing gear system accounts for failures of one or more landing gear assemblies.

The subject matter disclosed herein also provides systems for implementing the methods disclosed herein, and computer readable media, that includes executable instructions stored thereon that when executed by one or more computing devices, processors, etc., perform one or more of the actions of the methods.

A first representative embodiment of a method of extending a landing gear system for a vehicle is suitable for use with landing gear system having a first landing gear assembly and a second landing gear assembly. The method includes the steps of sensing a first load on the first landing gear assembly after the first landing gear assembly has reached a wheels-on-ground state and comparing the first load to a first target value. The method further includes the step of controlling an extension speed of the first landing gear assembly according to a difference between the first load and the first target value.

In any embodiment, the method further includes the steps of sensing a second load on the second landing gear assembly after the second landing gear assembly has reached a wheels-on-ground state; comparing the second load to a second target value; and controlling an extension speed of the second landing gear assembly according to a difference between the second load and the second target value.

In any embodiment, the extension speed of the first landing gear assembly is controlled to minimize the difference between the first load and the first target value, and the extension speed of the second landing gear assembly is controlled to minimize the difference between the second load and the second target value.

In any embodiment, the first and second target values increase as the first and second landing gear assemblies approach a weight-on-wheels state.

In any embodiment, the first target value equals the second target value.

In any embodiment, the extension speed of the first landing gear assembly is increased when the first load is less than the first target load value.

In any embodiment, the extension speed of the first landing gear assembly is decreased when the first load is greater than the first target load value.

In any embodiment, the step of comparing the first load to the first target value is performed by a proportional integration controller.

In any embodiment, extension speed of the first landing gear assembly from a retracted position to the wheels-on-ground state is controlled according to a predetermined extension profile.

In any embodiment, the method further includes the steps of monitoring the first and second landing gear assemblies for a failure after the first and second landing gear assemblies have reached the weight-on-wheels state; and controlling the position of the first landing gear assembly to minimize a difference between a first sensed vehicle height and the first target height value when no failures are detected.

In any embodiment, the method further includes the step of controlling the position of the first landing gear assembly to minimize a difference between the first load and a first third target value when a failure of the second landing gear assembly is detected.

In any embodiment, the third target value is a fixed value.

A second representative embodiment of a method for extending a landing gear system for a vehicle is suitable for a landing gear system having a plurality of landing gear assemblies, a landing gear supervisory control unit communicatively coupled to each of the plurality of landing gear assemblies, and a power source operatively coupled to the landing gear supervisory control unit. The method includes the steps of monitoring the plurality of landing gear assemblies for a first failure and cycling the power source off and on when the first failure occurs to a first of the plurality of landing gear assemblies. The method further includes the step of determining if the first failure has been resolved.

In any embodiment, the method further includes the steps of locking the first of the plurality of landing gear assemblies if the first failure has not been resolved; and continuing to extend each of the plurality of landing gear assemblies to which the first failure has not occurred.

In any embodiment, the method further includes the steps of locking a second of the plurality of landing gear assemblies when a second failure occurring to the second of the plurality of landing gear assemblies is detected; and continuing to extend each of the plurality of landing gear assemblies to which the first and second failures have not occurred to the greater of the extension of the first landing gear assembly and the extension of the second landing gear assembly.

In any embodiment, each of the plurality of landing gear assemblies corresponds to another of the plurality of landing gear assemblies that is symmetrically positioned relative to a centerline of the vehicle. The method further includes the steps of locking a third of the plurality of landing gear assemblies when a third failure occurring to the third of the plurality of landing gear assemblies is detected; and extending a fourth landing gear assembly to a position of the one of the first, second, and third landing gear assemblies that corresponds to the fourth landing gear assembly.

A third representative embodiment of a method of extending a landing gear system for a vehicle is suitable for use with a landing gear system having first, second, third, and fourth landing gear assemblies. The method includes the steps of sensing a first load on the first landing gear assembly after the first landing gear assembly has reached a wheels-on-ground state; comparing the first load to a first predetermined value; and controlling an extension speed of the first landing gear assembly according to a difference between the first load and the first predetermined value. The method further includes the steps of sensing a second load on the second landing gear assembly after the second landing gear assembly has reached a wheels-on-ground state; comparing the second load to a second predetermined value; and controlling an extension speed of the second landing gear assembly according to a difference between the second load and the second predetermined value.

In any embodiment, the method further includes the steps of sensing a third load on the third landing gear assembly after the third landing gear assembly has reached a wheels-on-ground state; comparing the third load to a third predetermined value; and controlling an extension speed of the third landing gear assembly according to a difference between the third load and the third predetermined value. The method further includes the steps of sensing a fourth load on the second landing gear assembly after the fourth landing gear assembly has reached a wheels-on-ground state; comparing the fourth load to a fourth predetermined value; and controlling an extension speed of the fourth landing gear assembly according to a difference between the fourth load and the fourth predetermined value.

In any embodiment, the positions of the first, second, third and fourth landing gear assemblies are controlled after the landing gear assemblies reach a weight-on-wheels state to maintain a constant vehicle height when no landing gear assembly faults are detected.

In any embodiment, the positions of each of at least two of the first, second, third and fourth landing gear assemblies are controlled after the landing gear assemblies reach a weight-on-wheels state to maintain a constant sensed load when a landing gear assembly fault is detected in one of the landing gear assemblies.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

During different phases of operation and landing gear assembly deployment, the position of the landing gear assembly wheels relative to the ground and the load supported by a particular landing gear assembly varies. As used herein, Wheels on Ground (WoG) for a single landing gear assembly is when the wheel(s) of the landing gear assembly first contact the ground (or support surface). Weight on Wheels (WoW) for an individual landing gear assembly is when the load on the landing gear is greater than any additional lift/levitation forces acting on that portion of the vehicle.

Embodiments of disclosed methods for stable extension of landing gear systems use information regarding the WoG and WoW states of individual landing gear assemblies and the system as a whole to stabilize the vehicle during a landing scenario. Sensor feedback regarding the states of the individual landing gear assemblies is used to drive each landing gear assembly separately to ensure vehicle stability as the landing gear assemblies extend to a WoW state. Sensor feedback is also used to control the extension and/or position of the landing gear assemblies in emergency scenarios, such as loss of motor control and/or sensor feedback of one or more of the landing gear assemblies.

Figure 1:
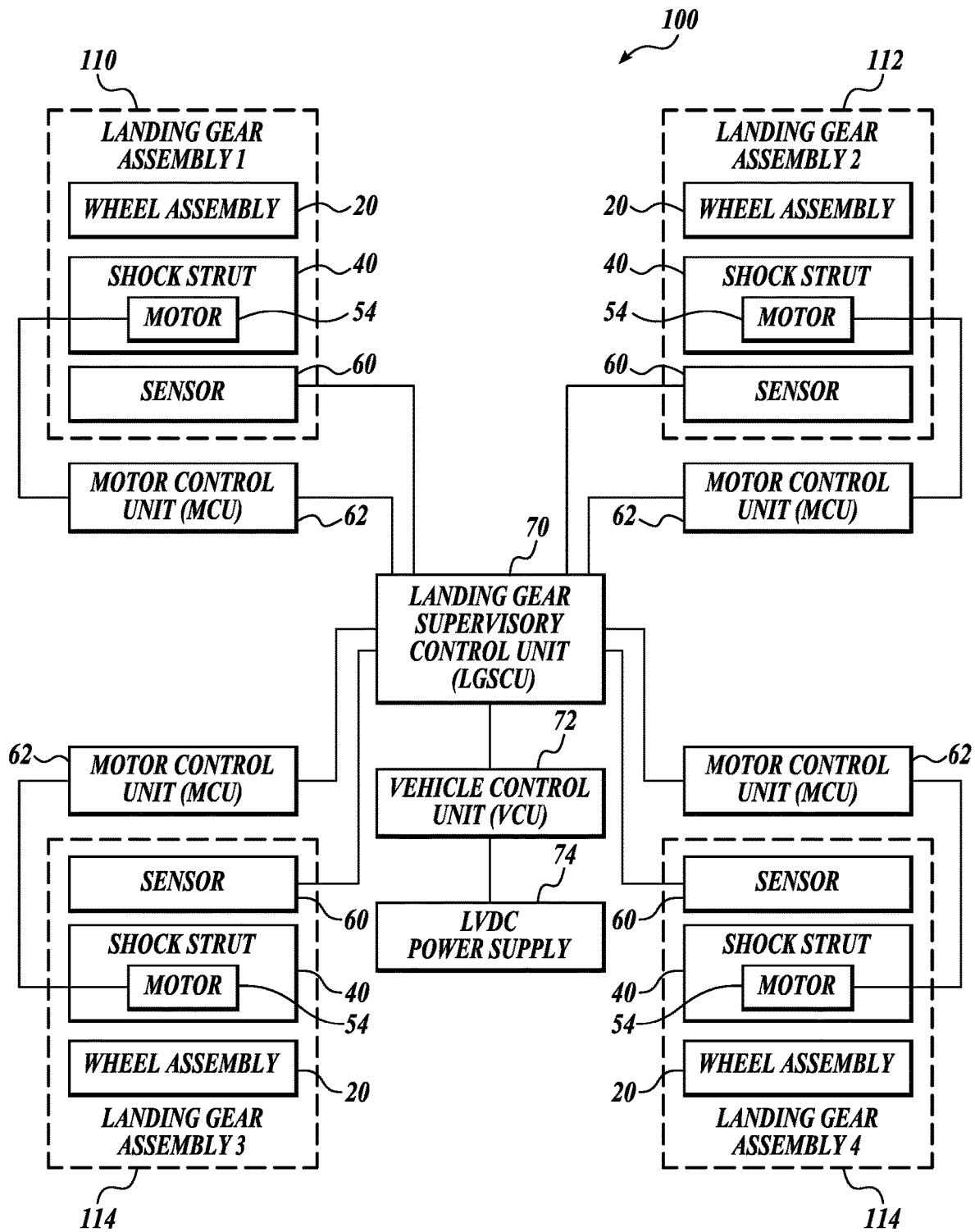
FIG. 1 shows a schematic view of an embodiment of a landing gear system according to various aspects of the present disclosure.

FIG. 1 shows a schematic view of a non-limiting example embodiment of a landing gear system 100 according to various aspects of the present disclosure. As described above, the landing gear system 100 may be included on an aircraft such that the landing gear system is in a deployed state to support the aircraft while on the ground, and in a retracted state when the aircraft is in flight. Although disclosed embodiments of a landing gear system 100 are described with respect to aircraft, the disclosed landing gear systems may be utilized with other vehicles or mechanisms for which a retractable support system is used. It will be appreciated that embodiments of the present disclosure may be used with other vehicles that use retractable landing gear assemblies at low speeds and levitation systems at high speeds, including but not limited to maglev vehicles.

As illustrated, the landing gear system 100 has four landing gear assemblies 110, 112, 114, and 116 that are configured for reciprocating movement between (1) an extended position during takeoff, landing, and taxiing, and (2) a retracted position during flight. In the illustrated embodiment, the landing gear system 100 includes four landing gear assemblies arranged in pairs, each pair having one landing gear assembly symmetrically positioned about the centerline of the aircraft relative to the other landing gear assembly, i.e., a left hand side landing gear assembly and a corresponding right hand side landing gear assembly. It will be appreciated that the landing gear system 100 is not limited to a particular number of landing gear assemblies. In some embodiments, the landing gear system 100 includes two or three independently actuated landing gear assemblies. Further, in some embodiments, one or more of the landing gear assemblies are located along the centerline of the aircraft, i.e., the landing gear assembly is not part of a pair of landing gear assemblies that are symmetric to each other with respect to the aircraft centerline.

Figure 2:
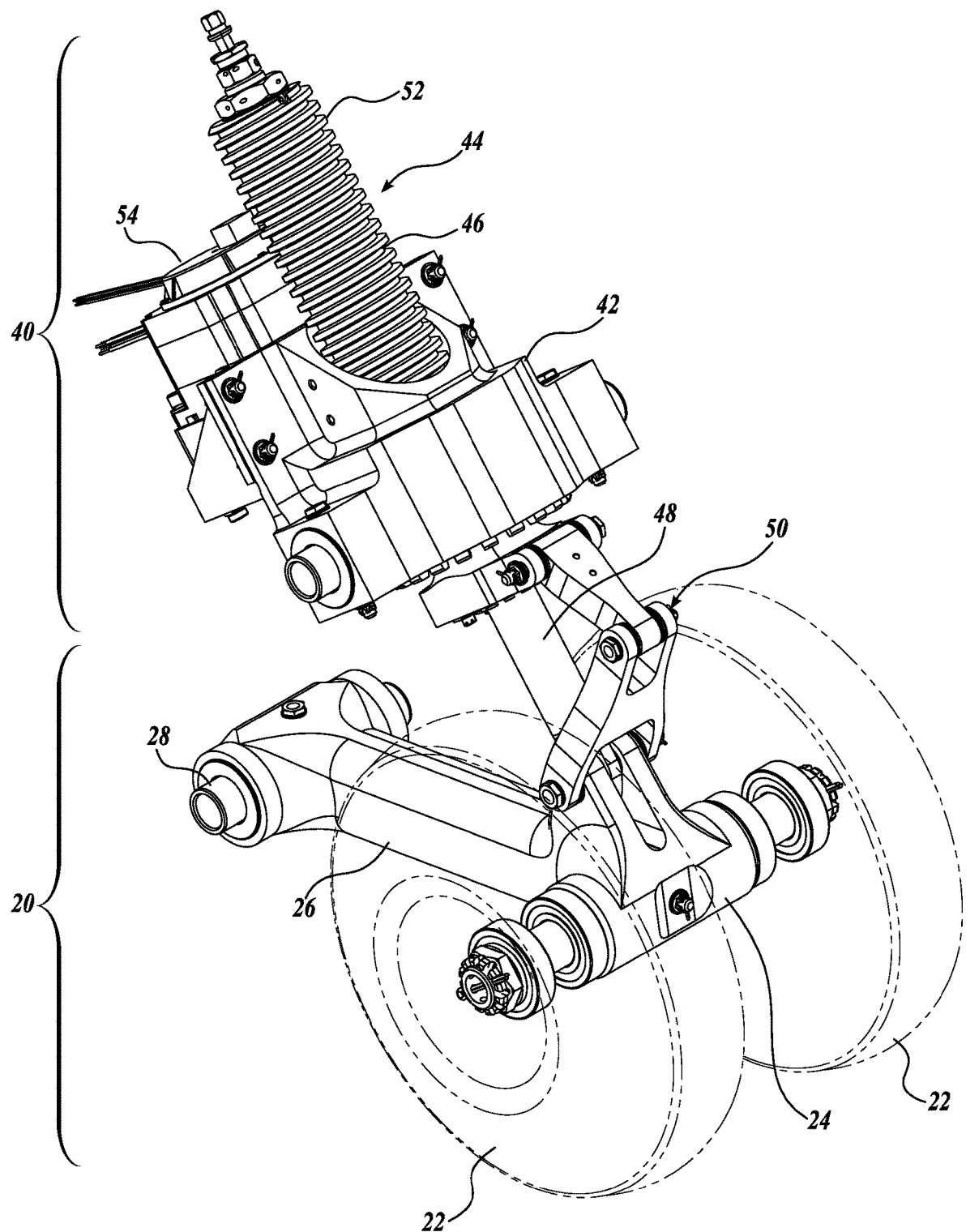
FIG. 2 shows a partial isometric view of a known wheel assembly and shock strut suitable for use as part of a landing gear assembly of the landing gear system of FIG. 1.

FIG. 2 shows a representative embodiment of a known wheel assembly 20 and a known shock strut 20 that is extendable and retractable. The wheel assembly 20 and shock strut are suitable to for use as part of one or more of the independently actuated landing gear assemblies 110, 112, 114, and 116 that make up part of the landing gear system 100 according to some embodiments of the present disclosure. The landing gear assembly 110 is disclosed in U.S. Patent Application Publication 2018/0312245 ("Klim et al."), filed Apr. 26, 2017, and currently assigned to Safran Landing Systems Canada Inc., the disclosure of which is expressly incorporated herein.

As shown in FIG. 2, the landing gear assembly 110 includes a wheel assembly 20 coupled to a shock strut 40 that selectively extends and retracts to move the landing gear assembly between an extended position and a retracted position. The wheel assemblies 20 include a pair of wheels 22 rotatably mounted to an axle 24 that is positioned at one end of a trailing arm body 26. A pivot pin 28 is positioned at the other end of the trailing arm body 26 and rotatably couples the trailing arm body to the vehicle.

The shock strut 40 includes a housing 42 pivotably mounted to the vehicle (not shown), such as an aircraft or a maglev vehicle. A shock absorber 44 extends through an aperture in the housing 42 and includes a cylinder 46 and a piston 48 slidingly engaged with the cylinder. The piston 48 is pivotably connected to the trailing arm body 26 of the wheel assemblies 20. A torque link assembly 50 maintains the rotational position of the trailing arm body 26 relative to the housing 42 about the longitudinal axis of the piston 48.

The cylinder 46 includes an external screw thread 52 that engages an internal screw thread formed in the aperture of the housing 42. A motor 54 is fixed to the housing 42 and selectively rotates the cylinder 46. Rotation of the cylinder 46 moves the piston 48 in an axial direction. The axial movement of the piston 48 rotates the wheel assembly 20 about its pivotal connection to the vehicle, thereby extending and retracting the landing gear assemblies 100.

It will be appreciated that the disclosed landing gear assembly 110 is exemplary only and should not be considered limiting. In this regard, the number and position of the wheels 22 included in the wheel assembly 20 may vary. In addition, any suitable drive mechanism capable of reciprocating the landing gear assembly between stowed and deployed positions may be implemented. These and other variations to the configuration and operation of the landing gear assembly are contemplated and should be considered within the scope of the present disclosure.

Referring back to FIG. 1, each landing gear assembly 110, 112, 114, and 116 includes one or more sensors 60 that detect various operational parameters. In some embodiments, the one or more sensors 60 includes a load cell operably coupled to the landing gear assembly to measure a load on the shock strut 40. In another embodiment, the one or more sensors 60 includes a rotary encoder operably coupled to the torque link assembly 50 to measure compression of the shock strut. In still another embodiment, the one or more sensors 60 includes a resolver measuring the angular position of the motor 54, thus measuring the position of the landing gear screw thread 52. It will be appreciated that the one or more sensors 60 may include any suitable type of sensor or combination of sensors to detect the position of the landing gear assembly 110, the load on the landing gear assembly, and any other necessary information regarding the position and operation of the landing gear assembly.

Each landing gear assembly 110, 112, 114, and 116 is communicatively coupled to a corresponding motor control circuit, such as Motor Control Unit 62 (MCU). The MCU 62 is communicatively coupled to and controls the motor 54 to selectively extend and retract the shock strut 40 and thus, the landing gear assembly. A supervisory control circuit, such as a Landing Gear Supervisory Control Unit 70 (LGSCU), is communicatively coupled to and controls the MCU 62 of each landing gear assembly 110, 112, 114, and 116. In this regard, the LGSCU 70 coordinates the operation of the MCUs 62 and thus, the landing gear assemblies 110, 112, 114, and 116. The LGSCU 70 is also communicatively coupled to and receives signals from the sensors 60 associated with each of the landing gear assemblies. As described in further detail, the LGSCU 70 coordinates and controls extension of the landing gear assemblies 110, 112, 114, and 116 based at least in part on the signals received from the sensors 60.

The LGSCU 70 is communicatively coupled to and receives commands from a vehicle control circuit, such as Vehicle Control Unit 72 (VCU). The pilot operates the VCU 72 to control various aspects of the aircraft, including the landing gear system 100. A Low Voltage Direct Current (LVDC) power supply 74 provides power to the VCU 72 and LGSCU 70.

In some embodiments, additional copies of VCU 72, LGSCU 70, and/or other components may be provided for redundancy. Further, the components of landing gear system 100 may be communicatively coupled via any suitable communication technique, including but not limited to serial wired communication, wireless communication (via Bluetooth, Wi-Fi, or other wireless communication techniques), and/or networked wired communication (via USB, Ethernet, CANBUS, or other wired communication techniques). Also, the separation of functionality between the VCU 72 and LGSCU 70 is an example only, and in some embodiments, functionality of the VCU 72 and LGSCU 70 may be combined in a single device.

Figure 3:
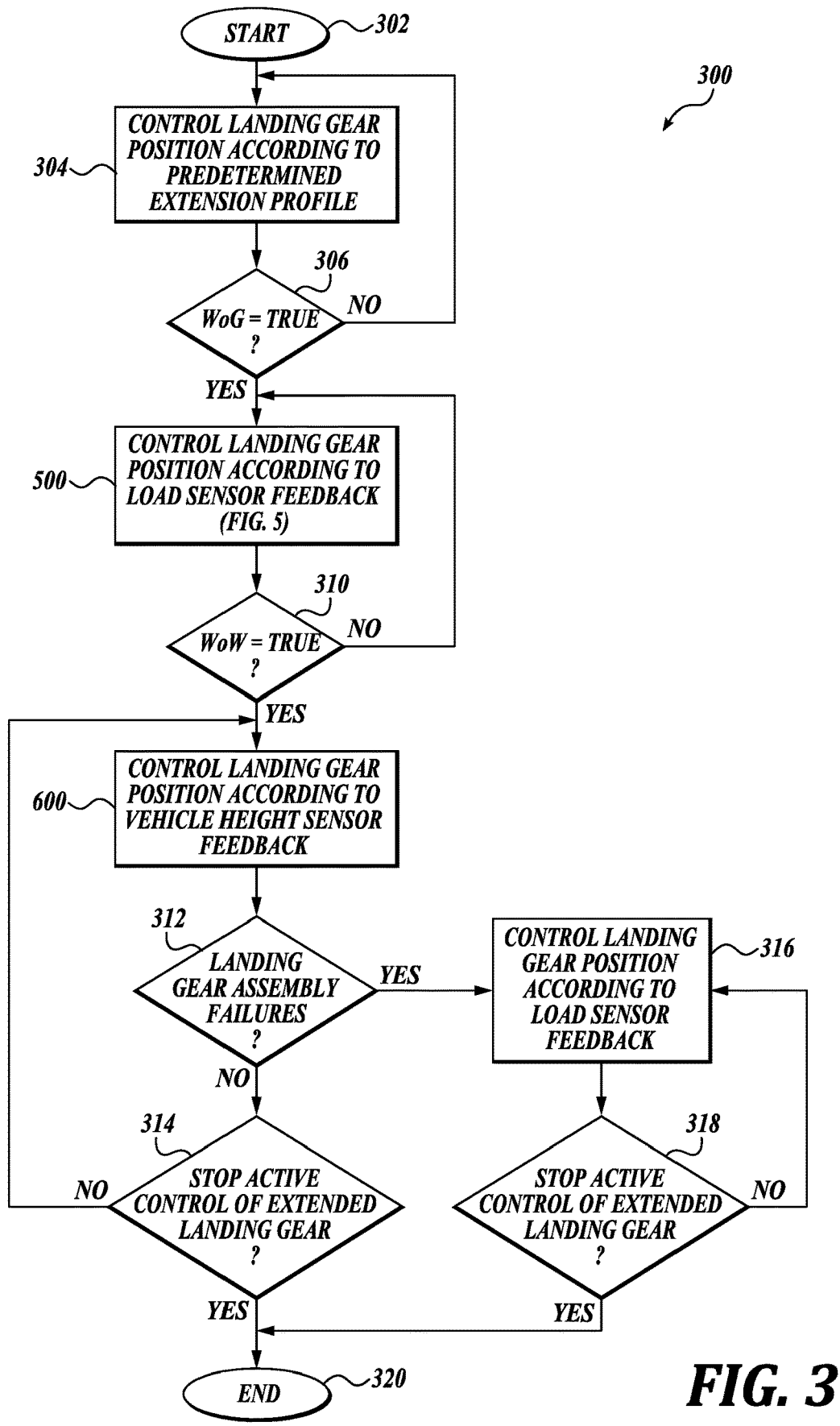
FIG. 3 shows a flow chart of a representative embodiment of a method for controlling extension of the landing gear system of FIG. 1.

FIG. 3 shows a flow chart of a representative embodiment of a method 300 for extending the landing gear system 100. The method 300 starts at block 302 and proceeds to block 304.

In block 304, initial extension of the landing gear assemblies is controlled. In the illustrated embodiment, the position of each landing gear assembly is controlled according to a predetermined extension profile. In some embodiments, the extension of one or more landing gear assemblies is controlled according to "position vs. time" values in lookup table. In some embodiments, the extension of one or more landing gear assemblies is controlled to occur at a fixed rate or at a variable rate. In some embodiments, the extension of one or more landing gear assemblies is controlled according to feedback from one or more sensors related to operational parameters of the vehicle and/or operator input. It will be appreciated that the extension of the landing gear assemblies in block 304 can be controlled according to any suitable parameters or inputs, and such embodiments should be considered within the scope of the present invention.

The method 300 proceeds to block 306, in which the WoG status of each gear assembly is determined. In some embodiments, WoG=TRUE when one landing gear assembly has reached a WoG state. In some embodiments, WoG=TRUE when all of the landing gear assemblies have reached a WoG state. In block 306, if WoG=FALSE, then the method 300 returns to block 304, and extension of the landing gear assemblies continues under the parameters of block 304. On the other hand, if WoG=True, then the method 300 proceeds to block 500.

Figure 4:
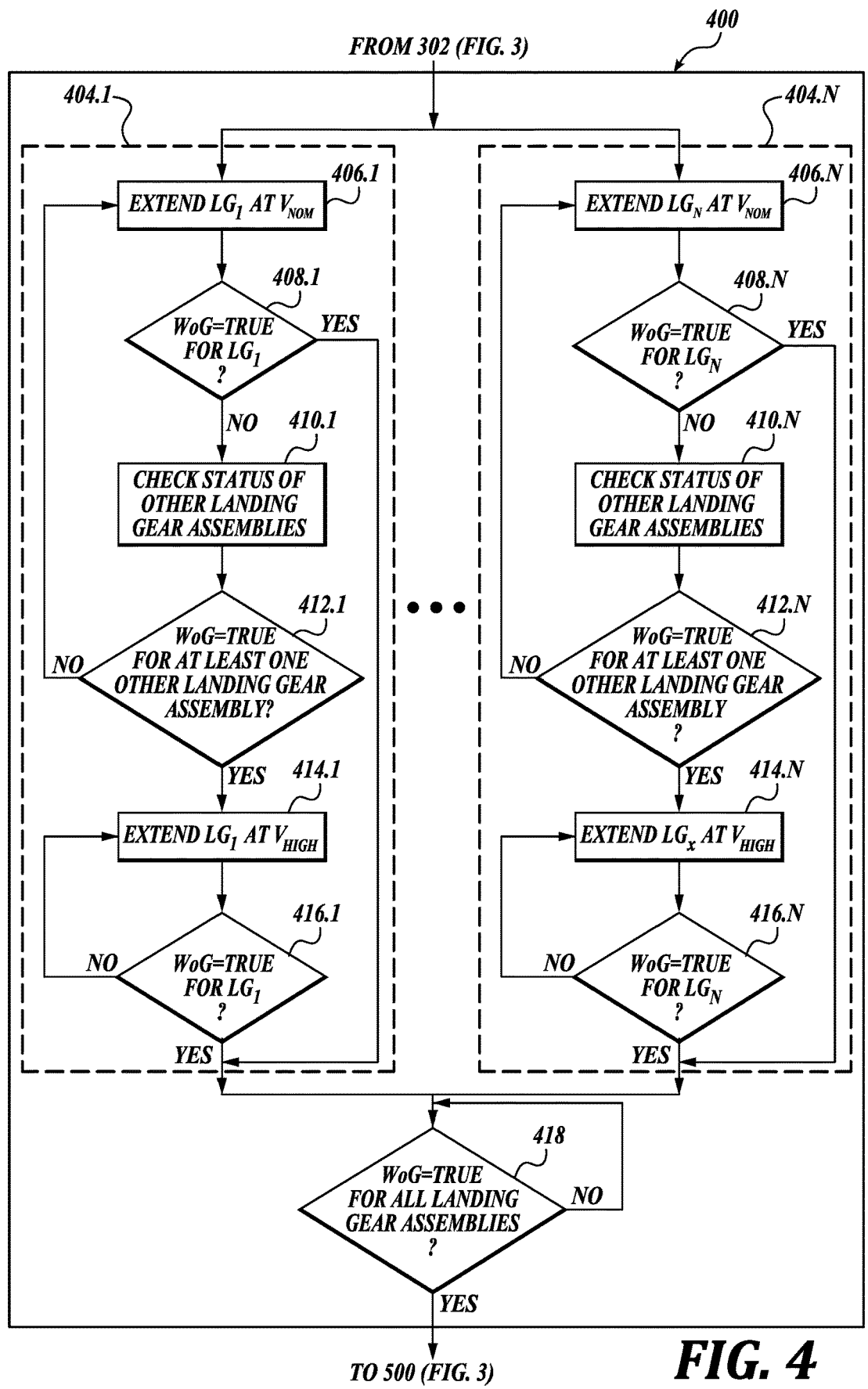
FIG. 4 shows a flow chart of portion of the method shown in FIG. 3 in which an extension of the landing gear system to a Wheels-on-Ground condition is performed.

FIG. 4 shows an embodiment of a process 400 suitable for the extension of the landing gear assemblies to a WoG state, wherein the process is an alternative to the steps carried out in blocks 302 and 304 of the method 300 shown in FIG. 3. In the illustrated embodiment, the process 400 begins when method 300 proceeds from block 302 to perform a number of processes in parallel, wherein each process relates to a particular landing gear assembly.

In the illustrated embodiment, the steps of process 400 are described for use with a landing gear system 100 with a number N of landing gear assemblies, wherein the processes for each of a first landing gear assembly (designated as $LG_1$) through the Nth landing gear assembly (designated as $LG_N$) are shown. Each process 404.1 through 404.N is identified with a reference number that indicates the landing gear assembly to which the process applies. For example, process 404.Y indicates the process as applied to the Yth landing gear assembly, wherein Y is a number from 1 to N.

Each step of the indicated processes 404.1 through 404.N is identified with a reference number that indicates the process performing the step, which in turn identifies the corresponding landing gear assembly. For example, block 406.Y indicates block 406, which is performed as part of process 404.Y, and corresponds to the Yth landing gear assembly, wherein Y is a number from 1 to N. To avoid repetition, the steps of the process related to the first landing gear assembly $LG_1$ will be described using reference numbers 4XX.1 with the understanding that corresponding steps are carried out for each of the other landing gear assemblies.

The method 400 proceeds from block 402 to the process 404.1 for the first landing gear assembly $LG_1$, which begins in block 406.1.

In block 406.1, the LGSCU 70 signals the MCU 62 to extend the first landing gear assembly $LG_1$ at a nominal speed $V_{NOM}$. The process 404.1 then proceeds to block 408.1, in which the WoG status of the first landing gear assembly $LG_1$ is determined. If the first landing gear assembly $LG_1$ has reached a WoG state, i.e., WoG=TRUE, then the process 404.1 ends, and the process 400 proceeds to block 418. On the other hand, if the first landing gear assembly $LG_1$ has not reached a WoG state, i.e., WoG=FALSE, then the process 404.1 proceeds to block 410.1.

In block 410.1, the status of each of the other landing gear assemblies ($LG_2$ through $LG_N$) is checked. The process 404.1 then proceeds to block 412.1.

In block 412.1, the LGSCU 70 determines if any one of the other landing gear assemblies $LG_2$ through $LG_N$ has reached a WoG state. If none of the other landing gear assemblies $LG_2$ through $LG_N$ has reached a WoG state, the process 400 returns to block 406.1, and the first landing gear assembly $LG_1$ continues to extend at the nominal speed $V_{NOM}$. If one or more of the other landing gear assemblies $LG_2$ through $LG_N$ has reached a WoG state, then the process 404.1 proceeds to block 414.1.

In block 414.1, the LGSCU 70 controls the MCU 62 to extend the first landing gear $LG_1$ at an increased speed $V_{HIGH}$ that is faster than the nominal speed $V_{NOM}$. The process 404.1 then proceeds to block 416.1

In block 416.1, the WoG status of the first landing gear assembly $LG_1$ is determined. If the first landing gear assembly $LG_1$ has not reached a WoG state, i.e., WoG=FALSE, then the process 400 returns to block 414.1, and the landing gear assembly continues to extend at the increased speed $V_{HIGH}$. If the first landing gear assembly $LG_1$ has reached a WoG state, i.e., WoG=TRUE, then the process 404.1 ends, and the process 400 proceeds to block 418.

In block 418, the LGSCU 70 determines if all of the landing gear assemblies have reached a WoG state. If not all of the landing gear assemblies have reached a WoG state, then the process 400 remains at block 418, until all of the landing gear assemblies have reached a WoG state. Otherwise, when all of the landing gear assemblies have reached a WoG state, the process 400 proceeds to block 500, as shown in FIG. 3, and method 300 continues.

Returning to FIG. 3, in block 500, extension of the landing gear assemblies to a WoW condition is controlled according to feedback from load sensors. In this regard, each landing gear assembly has a corresponding load sensor, and the position of each landing gear assembly is controlled according to feedback received from the corresponding load sensor. As will be explained in further detail below, extension of each landing gear assembly is controlled so that the load on each landing gear assembly corresponds to a target load value that signifies vehicle stability.

As the landing gear assemblies extend from a WoG state to a WoW state, the load on each landing gear assembly increases as the landing gear system support a greater portion of the vehicle weight. If one or more of the landing gear assemblies is extended further than the other landing gear assemblies, the landing gear assemblies or assemblies that are extended further will support a greater portion of the vehicle weight than the other landing gear assemblies. This unequal loading can cause instability, particularly when the vehicle is subject to dynamic operational loads. Accordingly, vehicle stability is improved by extending the landing gear assemblies in a manner that ensures the vehicle loads are distributed across the landing gear assemblies in a desired manner.

For a particular deployment position of a given landing gear assembly, there is a target load value, i.e., a load on that landing gear assembly that corresponds to a stable load distribution across the landing gear assemblies. In other words, if all landing gear assemblies are extended to positions that correspond to a stable operating condition, then each landing gear assembly will be subject to a target load corresponding to that landing gear assembly at that extension position.

In its simplest form, the target load for a given landing gear assembly can be defined as follows:

$$\text{Target Load} = \frac{\text{Total Vehicle Load}}{\text{Number of Landing Gear Assemblies}}$$

That is, the target load for each of the landing gear assemblies is such that each landing gear assembly carries an equal amount of the total vehicle load. It will be appreciated the target load need not be the same for all landing gear assemblies. In some embodiments, the target load is determined separately for one or more of the landing gear assemblies according to various factors. Non-limiting examples of factors used to determine the target load for a particular landing gear assembly include position of the landing gear assembly relative to the center of gravity of the vehicle, load capability and designed operating loads of the landing gear assembly; total number of landing gear assemblies, and/or any other suitable factors.

It will further be appreciated that the target load for a particular landing gear assembly can vary according to how much of the vehicle's weight is being supported by the landing gear assemblies at a particular time. In the example of a maglev vehicle, as the vehicle transitions from a magnetically levitated state to a state in which the vehicle is fully supported by the landing gear assemblies, the total vehicle load supported by the landing gear assemblies increase from 0 at initial WoG to the full weight of the vehicle in a WoW state. As such, the target load for each landing gear assembly is not static during a landing gear extension, but instead increases as the landing gear assemblies support a greater portion of the vehicle weight.

Figure 5:
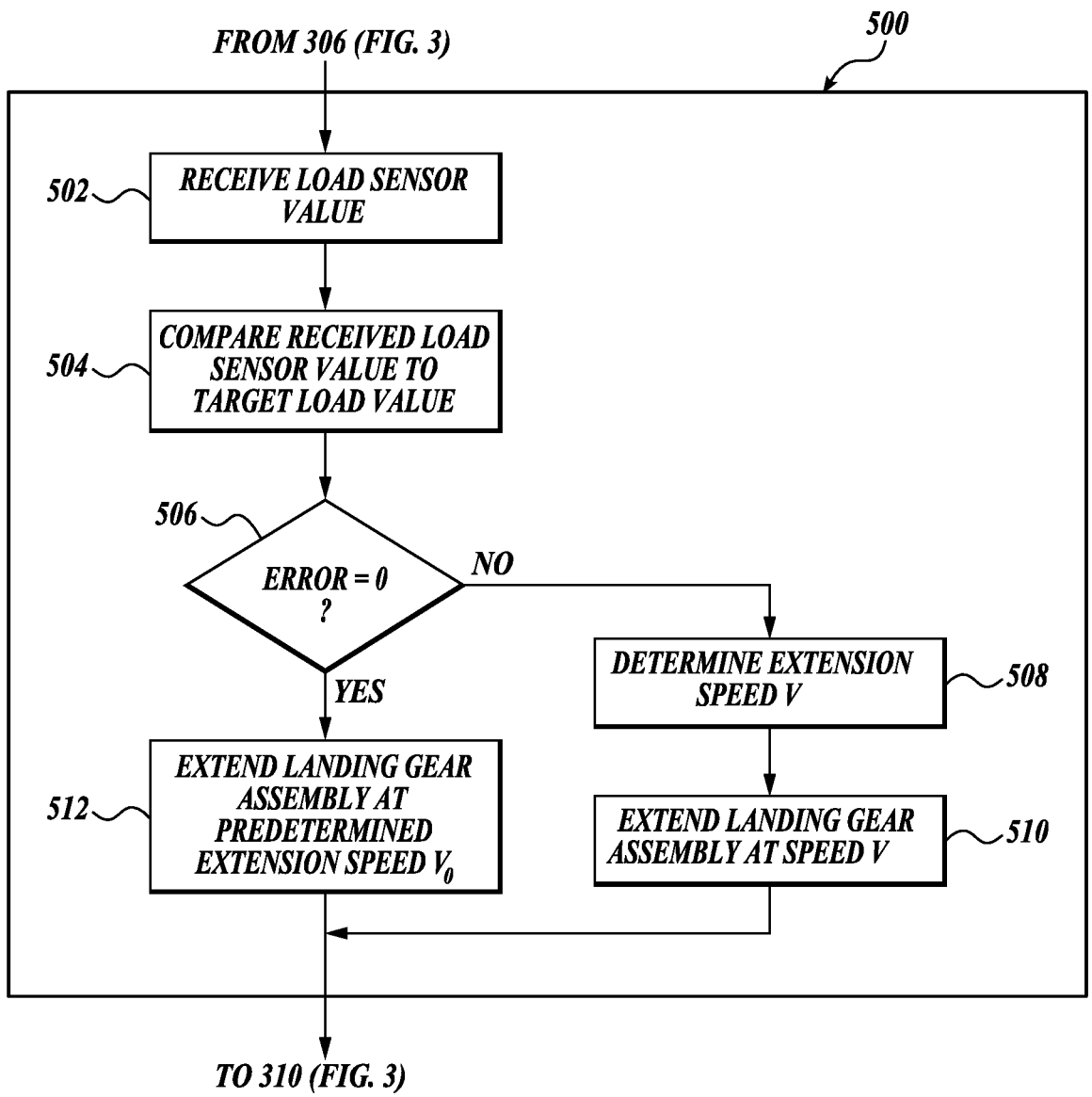
FIG. 5 shows a flow chart of portion of the method shown in FIG. 3 in which an extension of the landing gear system to a Weight-on-Wheels condition is performed.
Figure 6:
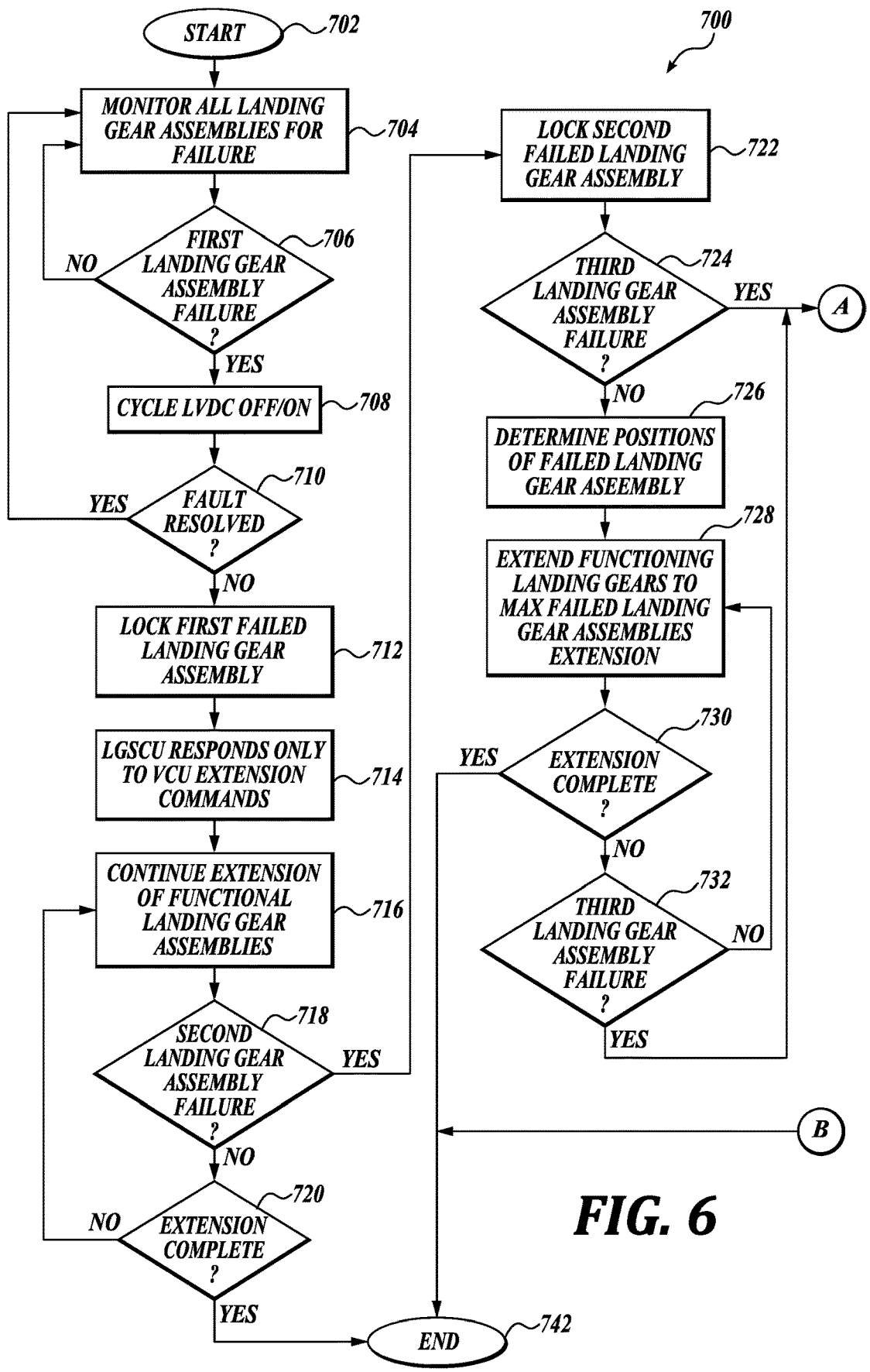
FIG. 6 shows a flow chart of a representative embodiment of a method for extending the landing gear system of FIG. 1, wherein the method responds to system failures.
Figure 6:
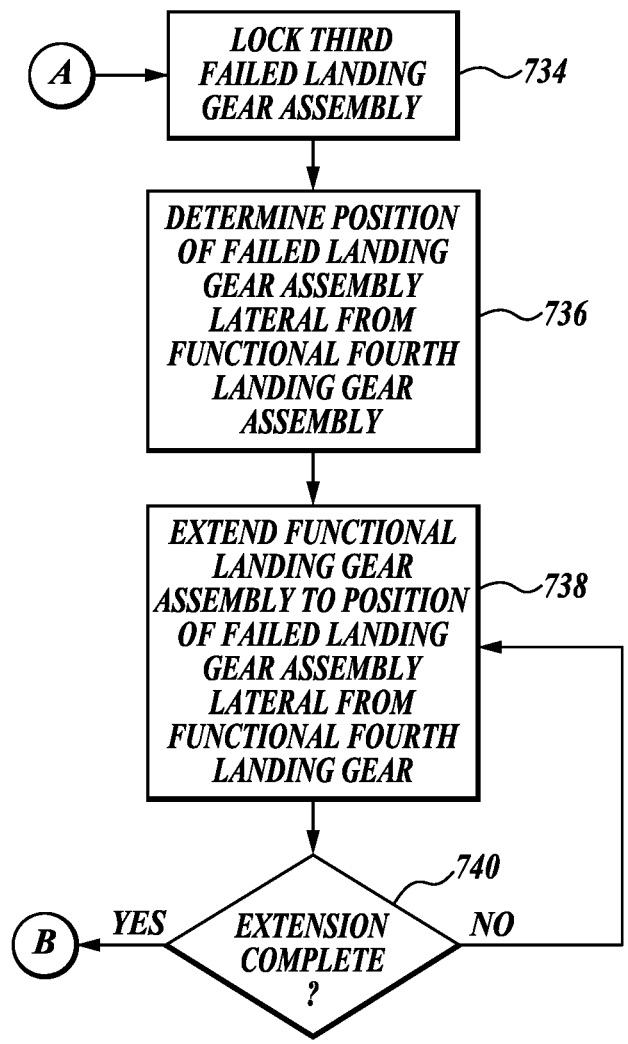

FIG. 5 shows an embodiment of the process performed in block 500 of FIG. 3 for extending each landing gear assembly from the WoG state to a WoW state. In the illustrated embodiment, the extension process is a closed loop control method that controls the deployment speed of each landing gear assembly separately as the landing gear assemblies move from the WoG state to a WoW state. More specifically, the process extends each landing gear assembly in response to a load value received from a load sensor corresponding to that landing gear assembly.

Referring back to the embodiment shown in FIG. 1, the LGSCU 70 receives feedback from load sensors 60 associated with each landing gear assembly 110, 112, 114, and 116 controls the deployment speeds of the landing gear assemblies. In some embodiments, the LGSCU 70 uses a proportional integration (PI) controller; however, it will be appreciated that any suitable type of controller or controllers may be used. For each landing gear assembly, the PI controller continuously compares load values received from the corresponding load sensor and compares them to the target load for that landing gear assembly at that position to determine the target load "error." The LGSU controls the individual landing gear assembly deployment speeds to minimize the error of each landing gear assembly.

If a landing gear assembly has an error indicating an actual (sensed) load that is less than the target load, the extension speed of the landing gear assembly may be increased in order to further extend the landing gear assembly relative to the other landing gear assemblies. As a result of this extension, the portion of the vehicle load carried by that landing gear assembly increases, and the error is reduced.

If a landing gear assembly has an error indicating a sensed load that is greater than the target load, the extension speed of the landing gear assembly may be decreased in order to allow the other landing gear assemblies to extend further relative to the landing gear assembly at issue. As a result, the portion of the vehicle load carried by the landing gear assembly at issue decreases, and the error indicated for the landing gear also decreases.

It will be appreciated that the indication of a target load error is not limited to a sensed load being unequal to a target load. In some embodiments, a target load error is determined if a sensed load is not within a certain tolerance of the target load value. Ins some embodiments, the target load is a range, and a target load error is determined if the sensed load is outside of the range of the target load.

Referring again to FIG. 5, steps of the method 300 performed in block 500 of FIG. 3 will be described. The method 300 will be described with respect to one of the landing gear assemblies with the understanding that a similar process is carried out for each of the remaining landing gear assemblies.

The method 300 proceeds from block 306 to block 502, in which the LGSCU 70 receives a signal from the load sensor 60 of the landing gear assembly. The method 300 then proceeds to block 504.

In block 504, the LGSCU 70 compares the received signal value to the target value of the landing gear assembly at the present position. The method 500 proceeds to block 506, wherein the LGSCU 70 determines an error value based on the comparison of the received signal value to the target value. If the target value=0, i.e., there is no error, the method 300 proceeds to block 512, and the landing gear is extended at a predetermined extension speed $V_0$. The method 300 then proceeds to block 310 of FIG. 3.

If the determined error value≠0 in block 506, i.e., the received signal value is not equal to the target value, then the method 300 proceeds to block 508.

In block 508, an extension speed V is set according to the error value. If the error value indicates that the load on the landing gear assembly is greater than the target value, then extension speed V is set such that $V<V_0$, i.e., the extension speed of the landing gear assembly is reduced. In some embodiments, the extension speed is set to 0, i.e., the landing gear assembly stops. In some embodiments, the sign of the extension speed V is reversed i.e., the landing gear assembly retracts.

If the error value indicates that the load on the landing gear assembly is less than the target value, then V is set such that $V>V_0$, and the extension speed of the landing gear assembly increases. The method 300 then proceeds to block 510.

In block 510, the landing gear assembly is extended or retracted according to the extension speed V determined in block 508. The process then proceeds to block 310 of FIG. 3.

Referring back to FIG. 3, in block 310, the LGSCU 70 determines if all of the landing gear assemblies have reached a WoW state. If all landing gear assemblies have reached a WoW state, then the method 300 proceeds to block 600. If all landing gear assemblies have not reached a WoW state, then the method 300 returns to block 500, and extension of the landing gear assemblies that have not reached a WoW state continues base on load sensor feedback until all landing gear assemblies have reached a WoW state.

In block 600, the landing gear assemblies have all reached a WoW state, and the vehicle is completely or primarily supported by the landing gear assemblies. With extension of the landing gear assemblies complete, control of the landing gear assemblies is primarily focused on maintaining vehicle stability. Sensors 60 positioned on the landing gear assemblies or on the vehicle itself detect the height of the vehicle relative to the support surface (ground) at each landing gear assembly. The LGSCU 70 receives signals from each vehicle height sensor and controls the corresponding landing gear assembly to maintain a constant target height. If the sensed height is greater than the target height, the landing gear assembly is retracted until the sensed height is equal to the target height. If the sensed height is less than the target height, then the corresponding landing gear assembly is extended until the sensed height is equal to the target height.

The method 300 proceeds to block 312, in which the LGSCU 70 or other suitable system checks for landing gear assembly faults that could impact the stability of the vehicle. Examples of such faults include but are not limited to mechanical jams and loss of communication between the landing gear assembly and the one or more control units, or loss of power to one or more landing gear system components. If no landing gear assembly failures are detected, the method 300 continues to block 314.

In block 314, the LGSCU 70 determines if a command to stop active control of the extended landing gear assemblies has been received. Such commands can occur when a vehicle reaches a docking station, when the landing gear is to be retracted during operation, when a manual override is required, or any other situation in which active control of the extended landing gear assemblies is no longer necessary or desired. If a command to stop active control of the extended landing gear assemblies has been received, the method 300 proceeds to block 320, and the method ends. If a command to stop active control of the extended landing gear assemblies has not been received, then method 300 returns to block 600, and the active control of the extended landing gear assemblies continues.

Returning to block 312, if a landing gear assembly failure is detected, the method 300 proceeds to block 316. In block 316, the LGSCU 70 controls the landing gear assemblies to maintain stability of the vehicle. In order to maintain stability, the LGSCU ensures that the extension of each of the functional landing gear assemblies is actively controlled to maintain a target load. In this regard, the LGSCU controls each landing gear assembly according to a process similar to the process performed in block 500, as shown in FIG. 5. However, unlike the process performed as the landing gear assemblies move from a WoG state to a WoW state, in block 312, the target load value is typically constant.

The method 300 proceeds to block 318, in which the LGSCU 70 determines if a command to stop active control of the extended landing gear assemblies has been received. If a command to stop active control of the extended landing gear assemblies has been received, the method 300 proceeds to block 320, and the method 300 ends. If a command to stop active control of the extended landing gear assemblies has not been received, then method 300 returns to block 316, and the active control of the functional landing gear assemblies continues according to load sensor feedback until a command to stop active control of the extended landing gear assemblies is received.

By using feedback from the load sensors 60 as described above, the illustrated load sensor stabilization method 300 enables the LGSCU 70 to deploy the landing gear assemblies to achieve a to a WoW state without determining the positions of the landing gear assemblies.

The LGSCU 70 is also configured to ensure safe extension of the landing gear system 100 when failures occur in one or more of the landing gear assemblies. For example, a mechanical jam may occur in which a mechanical malfunction prevents a landing gear assembly from extending properly. Other examples of failures include but are not limited to a loss of sensor feedback from one more of the landing gear assembles, a loss of communication between one or more of the MCUs 62 and the LGSCU 70, a loss of communication between the LGSCU and the VCU 72; a loss of power to one or more of MCUs, or any other fault resulting in the inability to command the extension of one or more of the landing gear assemblies.

FIG. 7 shows a method 700 of controlling the deployment of a landing gear system that accounts for various possible failures (faults) and controls the extension of the functioning landing gear assemblies to account for the failures and ensure safe landing. When these and other malfunctions occur, it is important that the remaining landing gear assemblies extend in a way that ensure safe landing of the aircraft. The described method 700 may be performed in conjunction, e.g., in parallel, with the previously described method 300 for extending the landing gear system 100 or portions thereof, or in conjunction with any other suitable system for extending a landing gear system.

The method 700 starts at block 702 and proceeds to block 704. In block 704, all landing gear assemblies are monitored for failures. The method 700 then proceeds to block 706.

In block 706, the existence of a first landing gear assembly failure is determined. As used herein, the "first" landing gear assembly failure is not limited to a particular landing gear assembly, but instead refers to whichever landing gear assembly experiences the first failure. If no failure is determined, the method 700 returns to block 704, and the monitoring of the landing gear assemblies for failures continues. If a first landing gear assembly failure (or more than one failure) is detected, then the method 700 proceeds to block 708.

In block 708, the LVDC power supply 74 is powered off and then on in an attempt to resolve the fault that caused the failure. The method then proceeds to block 710.

In block 710, if the fault that caused the failure is resolved, then the method 700 returns to block 704, and monitoring of the landing gear assemblies for failures resumes. If the fault that caused the failure is not resolved, i.e., the failure persists, then the method 700 proceeds to block 712.

In block 712, the first failed landing gear assembly is locked by switching off the LVDC power supply 74 to the corresponding MCU 62. The method 700 proceeds to block 714, wherein the LGSCU 70 switches states to only respond to commands from the VCU 72. In this regard, normal extension of the remaining functioning landing gear assemblies proceeds according to method 700 instead of the normal extension processes.

The method 700 proceeds to block 716, wherein the functioning landing gear assemblies continue to extend. The method proceeds to block 718, wherein the presence of a second landing gear assembly failure is determined. If no second landing gear assembly failure is detected, the method 700 proceeds to block 720, wherein it is determined whether or not extension of the landing gear assemblies has been completed. If the extension of the functioning landing gear assemblies has been completed, the method 700 proceeds to block 742 and ends. If the extension of the functioning landing gear assemblies has not been completed, then the method 700 returns to block 716, and the functioning landing gear assemblies continue to extend while being monitored for a failure of a second landing gear assembly.

If a second landing gear assembly failure is detected in block 718, the method proceeds to block 722, and the second failed landing gear assembly is locked by switching off the LVDC power supply 74 to the corresponding MCU 62. The method 700 proceeds to block 724, wherein the existence of a third landing gear assembly failure is determined. If a third landing gear assembly failure has not occurred, the method 700 proceeds to block 726.

In block 726, the position of each failed landing gear assembly is determined. The method 700 proceeds to block 728, in which the functioning landing gear assemblies are extended to the maximum extension of the failed landing gear assemblies. That is, the position of the failed landing gear assembly that has extended the furthest becomes the target extension position for the remaining functioning landing gear assemblies. While the functioning landing gear assemblies continue to extend, the method 700 proceeds to block 730.

In block 730 the extension of the functioning landing gear assemblies is checked. If the extension is complete, then the method 700 proceeds to block 742 and ends. On the other hand, if the extension of the functioning landing gear assemblies is not completed, the method 700 proceeds to block 732, and the existence of a third landing gear assembly failure is determined. If a third landing gear assembly has not failed, the method 700 returns to block 728, and extension of the functioning landing gear assemblies continues. If a third landing gear assembly has failed, the method 700 proceeds to block 734.

With a third landing gear assembly having been detected in block 724 or block 732, in block 734, the third failed landing gear assembly is locked by switching off the LVDC power supply 74 to the corresponding MCU 62. The method 700 then proceeds to block 736.

In block 736, three of the four landing gear assemblies have failed, and one landing gear assembly remains functioning. The position of the failed landing gear assembly that is positioned laterally from the functioning landing gear assembly is determined. That is, the position of the failed landing gear assembly that is symmetric about the centerline of the aircraft to the functioning landing gear assembly is determined. The method then proceeds to block 738.

In block 738, the functioning landing gear assembly is extended to the position of the corresponding landing gear assembly identified in block 736. Next, in block 740 it is determined if the functioning landing gear assembly is complete. If the extension is not complete, the method 700 returns to block 738, and the extension continues. On the other hand, if the extension is complete, then two corresponding landing gear assemblies (similarly positioned about the centerline of the aircraft) are in the same extended position, and the method 700 proceeds to block 742 and ends.

In summary, the method 700 accounts for one or more detected failures. When a failure is detected, the LVDC power supply 74 switches to 'Power Off' then 'Power On' in an attempt to regain a connection, resolve the jam, or otherwise correct the detected failure. If cycling the LVDC power supply 74 does not correct the failure(s), the method responds to the failure(s) as follows:

(1) when one landing gear assembly fails, the corresponding fault is triggered and the LGSCU 70 only responds to an extension command from the VCU. The system executes the extension command on the three functioning landing gear assemblies, and based on the system's ability to land on three landing gear assemblies, is able to safely land;

(2) when two landing gear assemblies fail, the last valid positions from both failed landing gear assemblies are saved. The two functional landing gear assemblies are extended to the same position as that of non-functional landing gear assembly that is extended the furthest. This ensures that if landing is necessary there will be three landing gear assemblies at the same extension position; and (3) when three landing gear assemblies fail, the last valid position of the failed landing gear assembly lateral from the functional landing gear assembly is saved. The functional landing gear assembly is extended to the position of this corresponding failed landing gear assembly so that there is lateral symmetry between at least two landing gear assemblies if landing is necessary.

Embodiments of methods for stable extension of landing gear assemblies disclosed herein are described in conjunction with a landing gear system 100 for an aircraft having four landing gear assemblies 110, 112, 114, and 116. It will be appreciated that the described methods may be utilized in conjunction with landing gear systems having any suitable number of landing gear assemblies positioned in any suitable configuration to support a vehicle. Further, it is contemplated that the systems and methods described herein are not limited to aircraft landing gear systems but may also be included on other vehicles that may include a landing gear system having one or more landing gear assemblies configured for reciprocating movement between extended and retracted positions. Such vehicles include but are not limited to maglev vehicles.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known method/process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A method of extending a landing gear system for a vehicle, the landing gear system comprising a first landing gear assembly and a second landing gear assembly, the method comprising the steps of:
sensing a first load on the first landing gear assembly after the first landing gear assembly has reached a wheels on ground state;
comparing the first load to a first target value; and
controlling an extension speed of the first landing gear assembly according to a difference between the first load and the first target value.

2. The method of claim 1, further comprising the steps of:
sensing a second load on the second landing gear assembly after the second landing gear assembly has reached a wheels on ground state;
comparing the second load to a second target value; and
controlling an extension speed of the second landing gear assembly according to a difference between the second load and the second target value.

3. The method of claim 2, wherein the extension speed of the first landing gear assembly is controlled to minimize the difference between the first load and the first target value, and the extension speed of the second landing gear assembly is controlled to minimize the difference between the second load and the second target value.

4. The method of claim 2, wherein the first and second target values increase as the first and second landing gear assemblies approach a weight on wheels state.

5. The method of claim 4, wherein the first target value equals the second target value.

6. The method of claim 1, wherein the extension speed of the first landing gear assembly is increased when the first load is less than the first target load value.

7. The method of claim 6, wherein the extension speed of the first landing gear assembly is decreased when the first load is greater than the first target load value.

8. The method of claim 1, wherein the step of comparing the first load to the first target value is performed by a proportional integration controller.

9. The method of claim 1, wherein extension speed of the first landing gear assembly from a retracted position to the wheels on ground state is controlled according to a predetermined extension profile.

10. The method of claim 1, further comprising the steps of:
monitoring the first and second landing gear assemblies for a failure after the first and second landing gear assemblies have reached the weight on wheels state; and
controlling the position of the first landing gear assembly to minimize a difference between a first sensed vehicle height and the first target height value when no failures are detected.

11. The method of claim 10, further comprising the step of controlling the position of the first landing gear assembly to minimize a difference between the first load and a first third target value when a failure of the second landing gear assembly is detected.

12. The method of claim 11, wherein the third target value is a fixed value.

13. A method of extending a landing gear system for a vehicle, the landing gear system comprising a plurality of landing gear assemblies, a landing gear supervisory control unit communicatively coupled to each of the plurality of landing gear assemblies, and a power source configured to provide power to the landing gear supervisory control unit, the method comprising the steps of:
monitoring the plurality of landing gear assemblies for a first failure;
powering the power source off and then on when the first failure occurs to a first of the plurality of landing gear assemblies; and
determining if the first failure has been resolved.

14. The method of claim 13, further comprising the steps of:
locking the first of the plurality of landing gear assemblies if the first failure has not been resolved; and
continuing to extend each of the plurality of landing gear assemblies to which the first failure has not occurred.

15. The method of claim 14, further comprising the steps of:
locking a second of the plurality of landing gear assemblies when a second failure occurring to the second of the plurality of landing gear assemblies is detected; and
continuing to extend each of the plurality of landing gear assemblies to which the first and second failures have not occurred to the greater of the extension of the first landing gear assembly and the extension of the second landing gear assembly.

16. The method of claim 15, wherein each of the plurality of landing gear assemblies corresponds to another of the plurality of landing gear assemblies that is symmetrically positioned relative to a centerline of the vehicle, the method further comprising the steps of:

locking a third of the plurality of landing gear assemblies when a third failure occurring to the third of the plurality of landing gear assemblies is detected; and extending a fourth landing gear assembly to a position of the one of the first, second, and third landing gear assemblies that corresponds to the fourth landing gear assembly.

17. A method of extending a landing gear system for a vehicle, the landing gear system comprising first, second, third, and fourth landing gear assemblies, the method comprising the steps of:

sensing a first load on the first landing gear assembly after the first landing gear assembly has reached a wheels on ground state;

comparing the first load to a first predetermined value;

controlling an extension speed of the first landing gear assembly according to a difference between the first load and the first predetermined value;

sensing a second load on the second landing gear assembly after the second landing gear assembly has reached a wheels on ground state;

comparing the second load to a second predetermined value; and controlling an extension speed of the second landing gear assembly according to a difference between the second load and the second predetermined value.

18. The method of claim 17, further comprising the steps of:

sensing a third load on the third landing gear assembly after the third landing gear assembly has reached a wheels on ground state;

comparing the third load to a third predetermined value;

controlling an extension speed of the third landing gear assembly according to a difference between the third load and the third predetermined value;

sensing a fourth load on the second landing gear assembly after the fourth landing gear assembly has reached a wheels on ground state;

comparing the fourth load to a fourth predetermined value; and controlling an extension speed of the fourth landing gear assembly according to a difference between the fourth load and the fourth predetermined value.

19. The method of claim 18, wherein the positions of the first, second, third and fourth landing gear assemblies are controlled after the landing gear assemblies reach a weight on wheels state to maintain a constant vehicle height when no landing gear assembly faults are detected.

20. The method of claim 19, wherein the positions of each of at least two of the first, second, third and fourth landing gear assemblies are controlled after the landing gear assemblies reach a weight on wheels state to maintain a constant sensed load when a landing gear assembly fault is detected in one of the landing gear assemblies.

* * * * *